United States Patent
Eschler

[11] 3,771,856
[45] Nov. 13, 1973

[54] ACOUSTO-OPTICAL LIGHT DIFFRACTION DEVICE

[75] Inventor: Hans Eschler, Muenchen, Germany

[73] Assignee: Siemens Aktiengesellschaft, Berlin and Munich, Germany

[22] Filed: July 14, 1972

[21] Appl. No.: 271,697

[30] Foreign Application Priority Data
Aug. 12, 1971 Germany............ P 21 40 548.1

[52] U.S. Cl. .................................. 350/161
[51] Int. Cl. ................................. G02f 1/28
[58] Field of Search.......... 350/161; 252/62.9; 423/551

[56] References Cited
UNITED STATES PATENTS
3,617,931  11/1971  Pinnow et al. ............ 350/161

Primary Examiner—David Schonberg
Assistant Examiner—Paul K. Godwin
Attorney—Benjamin H. Sherman et al.

[57] ABSTRACT

An acousto-optical light deflector comprised of a piezo-electric sound transducer adapted to receive a high frequency signal so as to generate ultrasonic sound waves and a crystalline sound medium coupled with the sound transducer to receive the sound waves and a beam of light so that the sound waves within the sound media forms a phase diffraction grating for the light beam. The sound transducer is preferably composed of a single crystalline lithium sulfate monohydrate and the sound media is preferably composed of $\alpha$-iodic acid.

4 Claims, 1 Drawing Figure

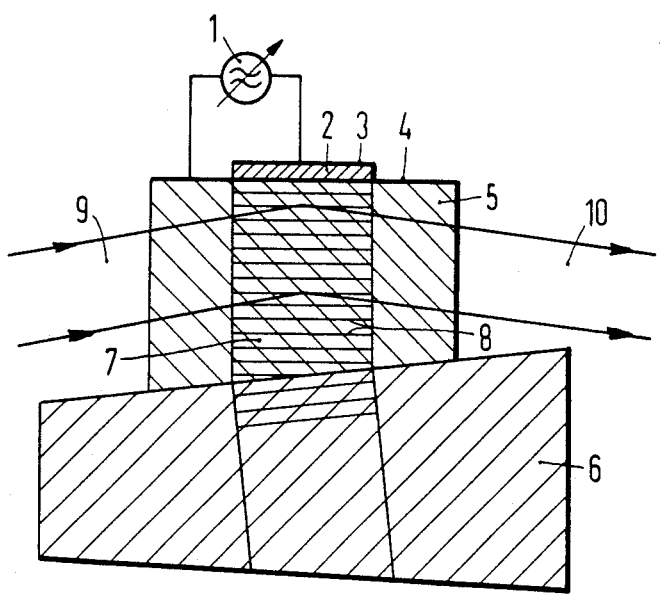

ACOUSTO-OPTICAL LIGHT DIFFRACTION DEVICE

BACKGROUND OF THE INVENTION

1. Field of the Invention

The invention relates to acousto-optical light deflectors and more particularly to acousto-optical light deflectors that include an electro-acoustical transducer.

2. Prior Art

Acousto-optical light deflection devices are known. Generally, all such devices require a transparent sound medium. Spacial periodic changes in the optical index of refraction of a sound medium are created due to the pressure fluctuations of the sound waves and because of the elasto-optical effects. Accordingly, light beams passing through such a sound medium are diffracted in various orders, as with a conventional diffraction grating.

The diffraction angle of a medium depends upon the distance between the pressure maximums, which means on the wavelength and therefore on the frequency of the supersonic waves. If the direction of light incidents is inclined by a small angle in respect to the sound wavefront, a Bragg reflection of the light at the sound wavefronts is observed at sound frequencies above 30 to 50 MHz. The total diffraction angle is equal to twice the Bragg angle. This diffraction angle is proportional to the sound frequency.

In order to render variations of the diffraction angle as large as possible, sound mediums which can be stimulated with sound waves of different very high frequencies must be selected.

Exemplary prior art solid state materials suitable as sound mediums for the visible spectral region are lead molybdate, tellurium dioxide and $\alpha$-iodic acid. Exemplary prior art solid state materials suitable as sound medium for the infra-red region are tellurium and germanium.

The generation of sound in such solid state sound mediums requires the attachment thereto of proper sound generators. Generally, piezo-electric transducers are utilized as sound generators and exemplary piezo-electric materials include lead zirconium titanate or lithium niobate. A sound generator must have certain characteristics. The degree of efficiency achieved in generating ultrasonic sound is highly dependent upon the proper selection of a suitable transducer material and the width of the sound frequency band that can be used with such a transducer material is dependent upon this degree of efficiency.

Further, the production of such sound transducer materials is relatively expensive. The coupling factor of a sound transducer is a measurement of the extent of the band width of the sound transmittal characteristics of such a transducer. The coupling factor of prior art materials is substantially smaller than the coupling factor of the transducer materials of the invention. Because of the high dielectric constants of lithium niobate (30 to 84) and ceramic (greater than 1,000), the use of such materials as piezo-electric transducers poses difficulty with frequencies of about 100 MHz because of the poor electrical matching of the blind impedances to the usual internal resistance of HF (high frequency) generators (50 ohms). In an optimum matching, the transducer impedance ranges between 1 to 10 ohms. Accordingly, prior art materials do not have optimum characteristics for achieving an effective and wide band sound generation for such purposes as scanning a large picture by means of light radiation.

SUMMARY OF THE INVENTION

The invention provides an acousto-optical light deflector device including an economically produced, wide band sound transducer composed of a single crystalline lithium sulfate monohydrate.

A preferred embodiment of such an acousto-optical light deflector device comprises a piezo-electric sound transducer composed of a single crystalline lithium sulfate monohydrate adapted to receive a high frequency signal and a crystalline sound medium composed of $\alpha$-iodic acid operationally coupled to the sound transducer so as to receive the sound wave and adapted to receive a beam of light so that the sound waves within the sound medium form a phase diffraction grating for the light beam passing through the medium.

BRIEF DESCRIPTION OF THE DRAWINGS

The single FIGURE is an elevated diagrammatic view of an exemplary embodiment of an acousto-optical light deflector constructed and operating in accordance with the principles of the invention.

DESCRIPTION OF THE PREFERRED EMBODIMENT

Generally the invention provides an economically produced, wide band sound transducer useful in an acousto-optical light deflector device and which is characterized by a high coupling factor.

The sound transducer of the invention is composed of a single crystalline lithium sulfate monohydrate. This crystalline material exhibits a number of advantageous characteristics over known sound transducer materials. The sound transducer material of the invention is extremely economical, is resistant to atmospheric influences and is very easy to handle. Further, the sound transducer material of the invention is readily formed into small crystal-plates with a thickness down to about $25\mu m$ and less. This characteristic is extremely important for the generation of high sound frequencies. The thickness d of a sound generator is inversely proportional to the resonance frequency fr that can be generated by a sound transducer in accordance with the equation: $fr = v/2d$, wherein $v$ is the speed of sound in the transducer, which is relatively high at about 5,500 m/s.

The hereinabove discussed coupling factor for lithium sulfate monohydrate is 0.38 whereas, for example, the coupling factor of lithium niobate is only 0.19 (z-cut). Sound waves with frequencies ranging over 100 MHz are generated with lithium sulfate monohydrate single crystals.

Preferably the sound medium is composed of $\alpha$-iodic acid because it has well matching characteristics with the lithium sulfate monohydrate transducer of the invention. The transducer of the invention has a low dielectric constant (10.3) as compared to that of ferroelectric transducer substances such as lithium niobate or lithium tantalate, and accordingly is operable in a pure longitudinal mode (i.e., in the form of a longitudinal oscillator) in a high frequency range of 100 to 200 MHz with the conventional internal resistances (50 ohms) of HF generators. Accordingly, the invention provides a wide band electrical matching between an HF signal generator and a transducer.

Since only low dielectric HF losses occur in lithium sulfate monohydrate, the stimulation of an acousto-optical light deflector that includes such a transducer is achieved with electrical power below 1 watt.

Referring now to the exemplary embodiment illustrated in the drawing, a piezo-electric transducer 2 which is composed of lithium sulfate monohydrate is stimulated by a high frequency signal generator means such as a frequency variable oscillator 1. A pair of electrodes 3 and 4, such as composed of gold, are positioned on opposite sides of the transducer 2 for conducting electrical energy from the oscillator 1. Electrode 4 is also in direct contact with a surface of a sound medium 5, which in preferred embodiments is composed of α-iodic acid. In other words, the high frequency signal generator means is operationally coupled with the transducer to produce ultrasonic sound waves. The sound medium 5 is operationally coupled with a sound absorber 6 which, for example, is composed of glass.

The transducer 2 produces an ultrasonic wave 7 within the sound medium 5 having plane wavefronts as indicated by numeral 8, with the distances between the fronts corresponding to the sound wave length. As will be noted from the drawing, the bottom surface of the sound medium 5 and the upper surface of the sound absorber 6 are at an angle in respect to the surfaces of the transducer 2. Sound waves travel through the medium 5 in a given direction and then through the absorber 6 at an inclination to the sound wave direction in medium 5. Accordingly, sound reflections at the contiguous surfaces of sound medium 5 and sound absorber 6 cannot interfere with the light diffraction process. A light beam, for example, a laser beam 9, is produced from a suitable source (not shown) in the direction of the arrows pointing to the left side so as to impinge onto the sound medium 5 at a small angle and pass into the medium. The laser beam is parallely deflected by the sound wavefronts 8 and is diverted into the direction of arrows 10.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appended claims.

I claim as my invention:

1. An acousto-optical light deflection device comprised of a piezo-electric sound transducer adapted to receive a high frequency signal so as to generate ultrasonic sound waves, said sound transducer being composed of a single crystalline lithium sulfate monohydrate and a crystalline sound medium coupled with said sound transducer to receive said sound waves and adapted to receive a beam of light therethrough whereby sound waves within the sound medium form a phase diffraction grating for the light beam passing through said medium.

2. An acousto-optical light deflection device comprised of a longitudinal oscillator composed of a single crystalline lithium sulfate monohydrate, said oscillator adapted to receive a high frequency signal so as to generate ultrasonic sound waves, and a crystalline sound medium coupled with said longitudinal oscillator to receive said sound waves and adapted to receive a beam of light therethrough whereby sound waves within the sound medium form a phase diffraction grating for the light beam passing through said medium.

3. An acousto-optical light deflection device comprised of a piezo-electric sound transducer adapted to receive a high frequency signal so as to generate ultrasonic sound waves, said sound transducer being composed of a single crystalline lithium sulfate monohydrate and a crystalline sound medium coupled with said sound transducer to receive said sound waves and adapted to receive a beam of light therethrough, said sound medium being composed of α-iodic acid, whereby sound waves within the sound medium form a phase diffraction grating for the light beam passing through said medium.

4. An acousto-optical light deflection device comprised of a high frequency signal generator means, a piezo-electric sound transducer operationally coupled with said generator means to receive said signal and produce ultrasonic sound waves, said transducer being composed of a single crystalline lithium sulfate monohydrate and a crystalline sound medium operationally coupled with said sound transducer to receive said sound waves and adapted to receive a beam of light therethrough, said sound medium being composed of α-iodic acid whereby sound waves within the sound media form a phase diffraction grating for the light beam passing through said medium.

* * * * *